March 29, 1966  W. I. HOYLE  3,243,070
CAP FOR POLYSTYRENE CONTAINER
Filed Dec. 2, 1964

INVENTOR
WALLIS I. HOYLE

BY Plumley, Tyner & Sandt
  Jerome Budig
ATTORNEYS

United States Patent Office 3,243,070
Patented Mar. 29, 1966

3,243,070
CAP FOR POLYSTYRENE CONTAINER
Wallis I. Hoyle, Midland, Mich., assignor to The Dow Chemical Company, Midland, Mich., a corporation of Delaware
Filed Dec. 2, 1964, Ser. No. 415,305
6 Claims. (Cl. 215—38)

This invention relates to a novel means for capping a plastic container and more particularly it relates to a novel means for capping a bottle or similar container made of polystyrene.

In the dairy industry, as in many industries, the manufacture and design of containers have undergone radical changes. Glass bottles were, at one time, used universally for packaging milk in volumes such as pints, quarts, and half-gallons, but the public now demands that milk as well as other products be sold in "throw-away" containers. Although rectangular paper cartons, coated with wax or with synthetic thermoplastic materials, such as polyolefins, are much more convenient than glass bottles, there are other problems associated with such containers. Paper milk containers are fashioned from paper in a sheet form and, therefore, the container depends upon the strength of adhesives to make it leakproof. The rough handling of such containers from the time the milk is bottled in the dairy to the time it is bought and used by the consumer frequently causes leaks to develop. It is now possible through the availability of inexpensive, synthetic plastics to provide "throw-away" containers made of such materials. Furthermore, it is possible to provide new methods of capping and sealing such containers.

It is an object of this invention to provide a novel material for capping plastic containers. It is another object of this invention to provide a novel means for capping and sealing a polystyrene container. Other objects will be apparent in the more detailed explanation of this invention which follows.

The foregoing objects are accomplished in accordance with this invention by providing a laminate of a metal foil, or other crimpable material, and a film of a thermoplastic material, the laminate being such that the film adheres more tenaciously to the crimpable material than it does to the polystyrene container.

Figure 1:
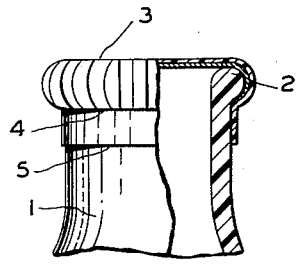
Figure 2:
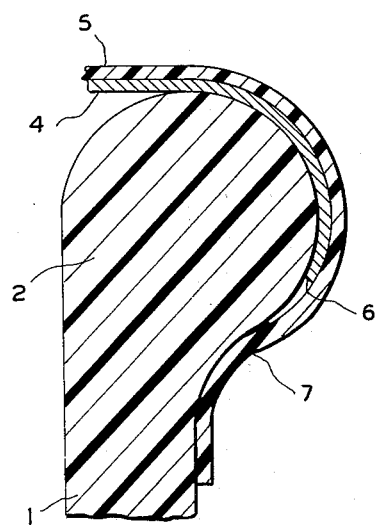
Figure 3:
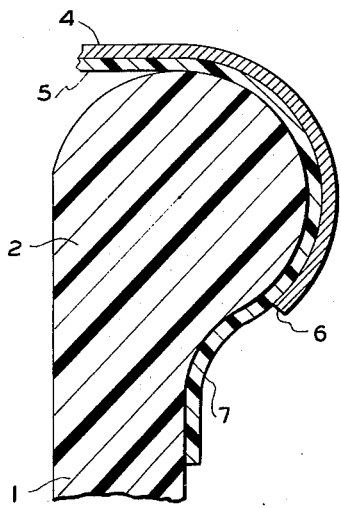
Figure 4:
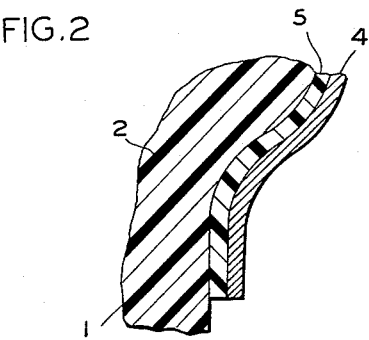

A more complete understanding of this invention may be had by reference to the attached drawings wherein FIGURE 1 is a partial cross-sectional view of the mouth of a milk bottle or similar container capped by the closure means of this invention, FIGURE 2 is an enlarged cross-sectional view of a portion of FIGURE 1, and FIGURE 3 is an enlarged cross-sectional view of a portion of FIGURE 1 showing an alternative to the arrangement of FIGURE 2. FIGURE 4 is an enlarged cross-sectional view of a portion of FIGURE 1 showing another alternative to the arrangement of FIGURE 2.

In FIGURE 1 of the drawings the mouth of bottle 1 is illustrated with a lip 2 around the mouth of the bottle. A cap 3 is shown as the closure for bottle 1. Cap 3 is a laminate of two layers, crimped layer 4 which is formed around lip 2 by a crimping action, and sealing layer 5 which is sealed to the outside surface of bottle 1.

In FIGURE 2 the enlarged drawing provides an enlarged illustration of the features of this invention. The lip of bottle 1 is shown at 2 closed by the cap which is made of crimped layer 4 and sealing layer 5. It may be seen that crimped layer 4 extends across the mouth of bottle 1 and is crimped around lip 2. The periphery of crimped layer 4 is indicated at 6. Sealing layer 5 is laminated to the outside of crimped layer 4 and extends beyond periphery 6 to the zone generally indicated at 7 where sealing layer 5 is adhered directly to bottle 1.

In FIGURE 3 there is shown an alternative arrangement of the closure of this invention. In this embodiment crimped layer 4 is not in direct contact with bottle 1. Only sealing layer 5 is in direct contact with bottle 1. In this instance sealing layer 5 extends beyond periphery 6 by an amount sufficient to provide a convenient area for heat sealing.

In FIGURE 4 the same general arrangement is employed as described with respect to FIGURE 3 except that crimped layer 4 and sealing layer 5 are coextensive. Since the metal foil of crimped layer 4 adheres tenaciously to sealing layer 5 than does sealing layer 5 to the material of lip 2, the closure may be removed by gripping crimped layer 4 and pulling it and sealing layer 5 away from lip 2.

In its broadest aspects this invention utilizes the combination of (1) a synthetic thermoplastic bottle, (2) a film-like closure that can be heat sealed to the bottle and subsequently can be manually stripped cleanly from the bottle, and (3) a crimpable metal cap that can also be heat sealed to the film. The materials which can be used to fulfill these purposes are bottles made of polystyrene, polyolefin, or polyvinyl chloride; films made of copolymers of ethylene and a member of the group consisting of vinyl acetate, ethyl acrylate, isobutyl acrylate, and acrylic acid, and caps made of aluminum foil.

A particularly desirable combination in this invention is when bottle 1 is polystyrene, sealing layer 5 is a co- is an aluminum composition. This combination of polystyrene, ethylene/vinyl acetate copolymer, and aluminum produces a unique effect as materials of construction for a container and its closure seal. Ethylene/vinyl acetate copolymeric compositions are capable of being readily heat sealed to polystyrene and yet the heat seal can be broken manually and the ethylene/vinyl acetate copolymer can be stripped cleanly from the polystyrene without damage to either of the two mating surfaces. Many other combinations of materials undergo a heat sealing operation by an actual melting of the interfacial surfaces. This produces an intermingling effect which leaves no line of demarcation between the two original portions, and a subsequent attempt to separate the two portions is likely to result in damage to both. Pits, pock marks, and cleavages result rather than a clean stripping.

A second benefit is derived when an aluminum foil is a part of the combination. When layer 4 is aluminum or an aluminum composition, the ethylene/vinyl acetate copolymer can be stripped from the polystyrene bottle, but it will retain its grip on the aluminum, permitting in one motion, the consumer to unseal the copolymer from the bottle and uncap the bottle. Ethylene/vinyl acetate copolymer seals more tenaciously to aluminum than it does to polystyrene, thus permitting this single motion to open the bottle.

Although aluminum is preferred for layer 4 other materials can be substituted therefor with some degree of success. Layer 4 should be capable of being crimped onto the mouth of the bottle, and it should provide a good vapor barrier. Metal foils provide these properties best, since they can be tightly laminated to ethylene/vinyl acetate copolymers. The metal foil may however be substituted by a metal-paper laminate oriented in such a way that the metal would be in contact with the layer of ethylene/vinyl acetate copolymer.

The heat sealing operation can be performed simultaneously with, or at a different time from, the crimping of the metallic layer of the cap. The copolymeric film can be applied to a metallic cap while in place on a bottle as in FIGURE 2, or the metallic cap can be applied to a copolymeric film previously attached to the bottle as in FIGURE 3, or the copolymer can be laminated to the metallic surface before the cap is applied to the bottle. A preferred method of operation is to laminate a film of ethylene/vinyl acetate copolymer to a layer of aluminum foil and thereafter to apply the resulting laminate to a polystyrene bottle. The laminate is preferably preheated before it is applied to a bottle so that the degree of preheat is sufficient to produce a heat seal between the copolymer and the polystyrene bottle. This heat seal is strong enough to withstand the hydrostatic pressure of liquid contents when the polystyrene bottle is squeezed manually or is subjected to the expected amount of rough handling.

It is not intended that this invention be limited to containers for any particular type of contents, although this invention is especially well adapted for use with containers for foods such as milk, juices, fruits, vegetables, preserves, oils, and many other perishable materials. It is not intended that this invention be restricted or limited in any manner other than that incorporated into the appended claims.

What is claimed is:

1. The combination of a container and a closure comprising a container made of a synthetic thermoplastic selected from the group consisting of polystyrene, polyolefin, and polyvinyl chloride and a manually crimpable, metallic closure for the container comprising a metal foil adhering to a layer of a copolymer of ethylene and a member of the group consisting of vinyl acetate, ethyl acrylate, isobutyl acrylate, and acrylic acid said layer being heat sealed to said container.

2. The combination of claim 1 wherein the said closure comprises an aluminum foil and a film of an ethylene/vinyl acetate copolymer.

3. The combination of claim 1 wherein said container is a polystyrene bottle and said closure comprises a laminate of an inner ply of aluminum foil and an outer ply of an ethylene/vinyl acetate copolymer, said outer ply extending beyond the periphery of said aluminum foil by an amount sufficient to permit said outer ply to be heat sealed to said polystyrene bottle.

4. The combination of claim 1 wherein said container is a polystyrene bottle and said closure comprises a laminate of an outer ply of aluminum foil and an inner ply of an ethylene/vinyl acetate copolymer, said inner ply extending sufficiently beyond the periphery of said aluminum foil to provide a portion which can be manually gripped for removing the cap.

5. The combination of claim 1 wherein said container is a polystyrene bottle and said closure comprises a laminate of an outer ply of aluminum foil and an inner ply of an ethylene/vinyl acetate copolymer, said inner ply and said outer ply being substantially coextensive.

6. The combination of claim 1 wherein said closure comprises a laminate of a metal foil and said layer.

References Cited by the Examiner

UNITED STATES PATENTS

| | | | |
|---|---|---|---|
| 2,634,013 | 4/1953 | Atwood | 215—38 |
| 2,937,481 | 5/1960 | Palmer. | |
| 3,073,477 | 1/1963 | Betner | 220—54 |

GEORGE O. RALSTON, *Primary Examiner.*

FRANKLIN T. GARRETT, *Examiner.*

R. PESHOCK, *Assistant Examiner.*